United States Patent [19]

Beutelspacher et al.

[11] Patent Number: 4,974,193
[45] Date of Patent: Nov. 27, 1990

[54] CIRCUIT ARRANGEMENT FOR PROTECTING ACCESS TO A DATA PROCESSING SYSTEM WITH THE ASSISTANCE OF A CHIP CARD

[75] Inventors: Albrecht Beutelspacher, Ottobrunn; Annette-Gabriele Kersten, Wiesbaden; Dietrich Kruse, Ottobrunn, all of Fed. Rep. of Germany

[73] Assignee: Siemens Aktiengesellschaft, Berlin and Munich, Fed. Rep. of Germany

[21] Appl. No.: 164,477

[22] Filed: Mar. 4, 1988

[30] Foreign Application Priority Data

Mar. 4, 1987 [DE] Fed. Rep. of Germany ....... 3706955
Aug. 12, 1987 [DE] Fed. Rep. of Germany ....... 3726881

[51] Int. Cl.$^5$ .................... G06F 3/00; G06K 5/00
[52] U.S. Cl. .................... 364/900; 364/927.8; 364/949.71; 364/969.4; 235/380; 380/25
[58] Field of Search ............. 364/200, 900; 235/380; 380/25

[56] References Cited

U.S. PATENT DOCUMENTS

| | | | |
|---|---|---|---|
| 4,224,666 | 9/1980 | Giraud | 364/200 |
| 4,679,236 | 7/1987 | Davies | 235/380 X |
| 4,746,788 | 5/1988 | Kawana | 235/380 |
| 4,786,790 | 11/1988 | Kruse et al. | 235/380 |
| 4,819,204 | 4/1989 | Schrenk | 235/380 X |

*Primary Examiner*—Thomas M. Heckler
*Attorney, Agent, or Firm*—Hill, Van Santen, Steadman & Simpson

[57] ABSTRACT

Dependent on a variable start value (s), a random number according to the relationship $v = f(K;s)$ is generated from a ciphering algorithm (f) implemented in the microprocessor of the chip card and from a stored secret cipher (K). This random number can be intermediately stored in a register and, when generating a new random number, can be logically operated with a variable input quantity (for example, with the variable start value (s), to form a modified variable start value (s'), for use in establishing protected communications between the chip card and a user terminal having a chip card reader.

10 Claims, 3 Drawing Sheets

CIRCUIT ARRANGEMENT FOR PROTECTING ACCESS TO A DATA PROCESSING SYSTEM WITH THE ASSISTANCE OF A CHIP CARD

BACKGROUND OF THE INVENTION

The invention is directed to a data processing arrangement incorporating a chip card having a secret cipher, for protecting access to the data processing system.

The protection of data is playing an increasingly important part in modern data processing and communications systems. The quality of a system with respect to an adequate data protection is critically dependent upon the degree to which one succeeds in making access to the system possible only for authorized persons and, conversely, keeping unauthorized persons locked out with absolute certainty. A simple although not absolutely certain possibility for checking the access authorization to a system is to use passwords that are only known to the authorized user and that the user can change as often as he desires. Since there is the risk given passwords that unauthorized persons will find them out or hear them, additional protection measures are indispensible. One of these measures, for example, is the encoding and decoding of the transmitted information, a measure that is realizable in data processing systems, among other things, with the assistance of a chip card.

With the increasing involvement of the chip card in data processing systems, however, an additional security risk again arises because chip cards can be relatively easily lost. Care must therefore be exercised to see that the chip card is protected against potential misuse in all instances when lost. The chip card is therefore designed such that the data stored in a protected chip card can only be accessed when the user previously inputs an identifier that is stored in the chip card, for example a personal identification number, referred to as a PIN.

A further security barrier can be erected with the assistance of the authentication of the chip card to the system. This authentication prevents an arbitrary subscriber from being authorized to access secret information in the system. A critical precondition for the authentication is a personal feature of the subscriber that cannot be copied. This non-copyable feature of the subscriber is achieved with the assistance of a secret cipher for the encoding and decoding that is known to the two partners, i.e. to the chip card on the one hand and to the system on the other hand.

The security can also be increased in that an arbitrary number is generated in the chip card upon involvement of the secret cipher, this arbitrary number being transmitted from the chip card to the system. It would also be conceivable to generate this arbitrary number in a program-oriented fashion. In the opinion of security experts, however, such generated arbitrary numbers are not arbitrary enough and, thus, are not secure enough in the final analysis.

SUMMARY OF THE INVENTION

The object of the present invention is to disclose a way of realizing the generation of arbitrary numbers that satisfies highest security demands.

This object is achieved by generating a random number by use of a ciphering algorithm, employing a variable user determined start value. The involvement of the variable starting value when generating the arbitrary number enables a dynamic authentication, with the advantage that the respectively generated arbitrary number is also adequately arbitrary in view of the required security criteria.

Advantageous improvements of the invention comprise various possibilities with respect to the variable start value for the arbitrary number generator dependent on the type of chip card. When a battery-operated, real-time clock module is implemented in the chip card, the start value can be derived from the respective current time of day, potentially combined with the date. A second possibility is that the memory area of the chip contains variable data and that the start value is acquired from selected data of this memory area. Finally, the start value can also be forwarded to the chip card from the outside via a terminal.

A further, advantageous development of the invention includes means for storing the arbitrary number, and uses a logical operation of a variable input quantity with the stored arbitrary number to form a modified, variable start value. This has the advantage that a new, arbitrarily "random" random number can be generated by the modification of a variable start value with a random number that was already previously generated.

The random number may be used for authentication of the chip card. One system describing such a use is described in the copending application of Kruse, et al. for "Data Exchange System With Authentication Code Comparator", Ser. No. 164,476, filed Mar. 4, 1988, now U.S. Pat. No. 4,786,790.

BRIEF DESCRIPTION OF THE DRAWINGS

Exemplary embodiments of the invention shall be set forth in greater detail below with reference to the drawings, in which.

DESCRIPTION OF THE PREFERRED EMBODIMENTS

Figure 1:
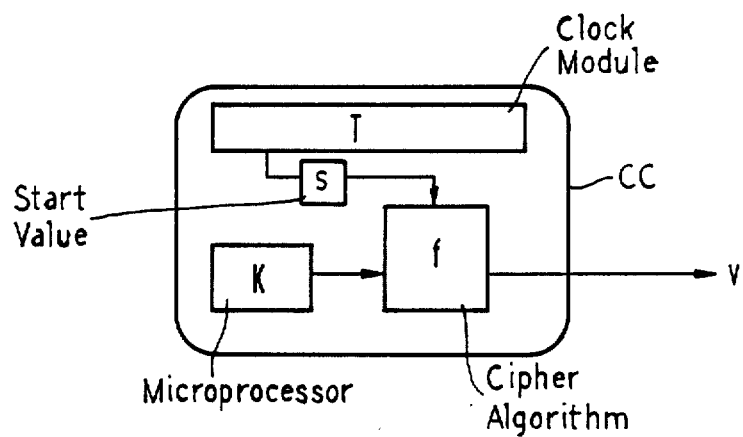
FIGS. 1 and 2 each show a chip card comprising a random generator initialized by a variable start value.

FIG. 1 shows the fundamental structure of a processor chip card that contains a random generator implemented in the integrated module. The generation of the random numbers ensues with the assistance of the stored secret cipher K and of a ciphering algorithm f implemented in the microprocessor on the card, whereby a variable start value s is used as input quantity for the random generator in order to calculate an adequately "random" random number v. As may be seen from FIG. 1, this variable start value s can be acquired from the output signal of a real time clock module T implemented in the integrated module. This measure, however, assumes that the chip card contains a battery for continuously supplying power to the clock module T.

Figure 2:
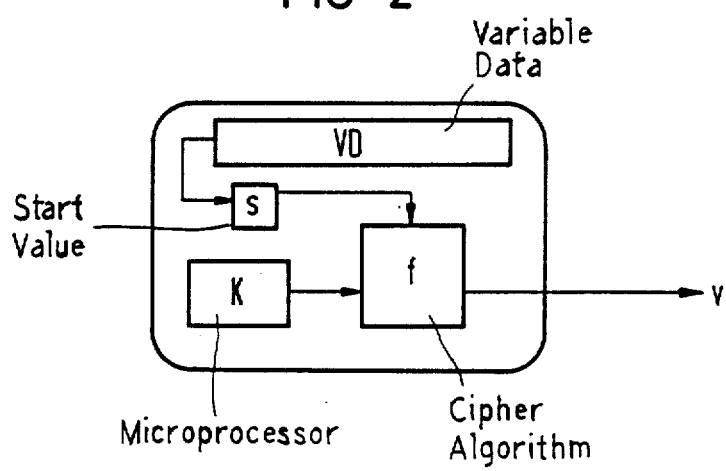

The exemplary embodiment of FIG. 2 provides a somewhat simpler solution wherein the start value for the random number generator is derived or, respectively, selected from variable data VD stored in the chip. Finally, there is also the possibility of not generating the start value in the chip card itself but forwarding this start value to the chip card from the outside.

Figure 3:
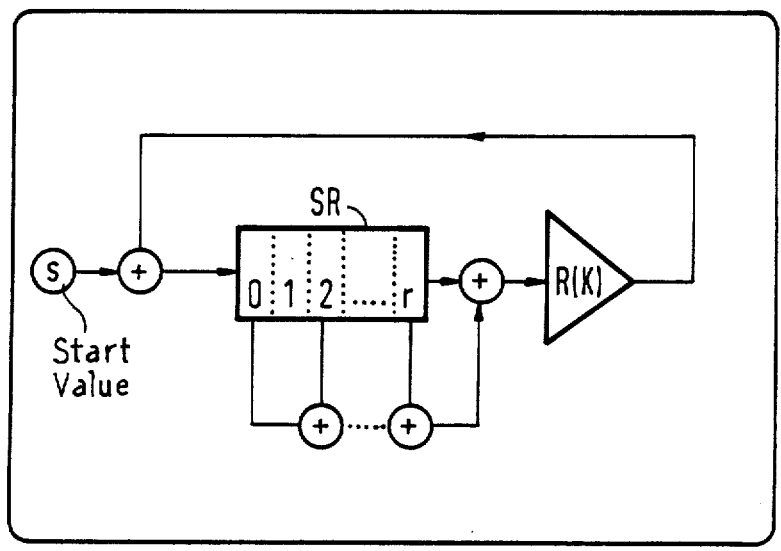
FIGS. 3 and 4 show an example of a random number generator at the start and at the signal output phase, respectively.
Figure 4:
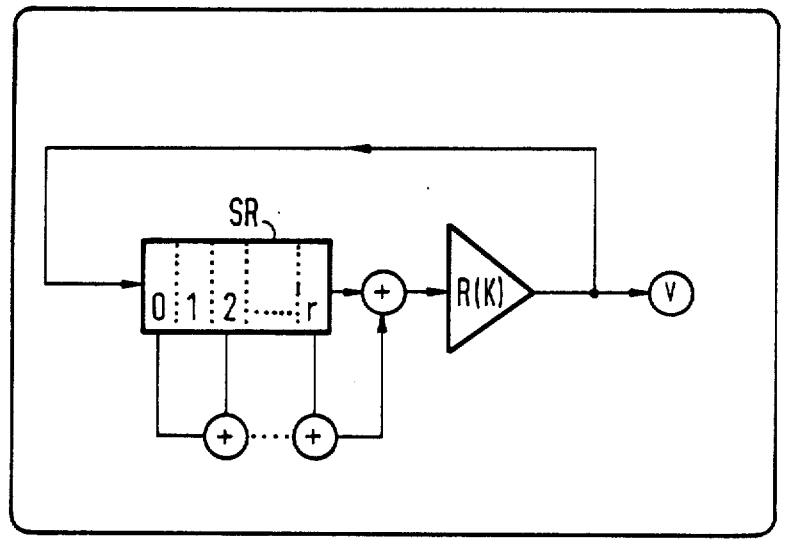

FIGS. 3 and 4 show a random number generator employable in the chip card of FIGS. 1 and 2 that, for example, is based on a non-linearly fed back shift register. In detail, this random number generator is composed of a shift register SR having the length r to whose input the start value s having, for example, 64 bits is supplied. The content of these cells is operated with the output of the shift register on the basis of a linear combination of outputs from individual register cells. In a following module R, the cyclically shifted content of the shift register SR is subjected to a non-linear function dependent on the cipher K (for example, 64 bits). The output of this module R is fed back to the input of the shift register SR during the cycle phase. FIG. 4 shows the point in time after the conclusion of the cycle phase wherein the random number v, likewise having 64 bits, is available at the output of the module R.

Figure 5:
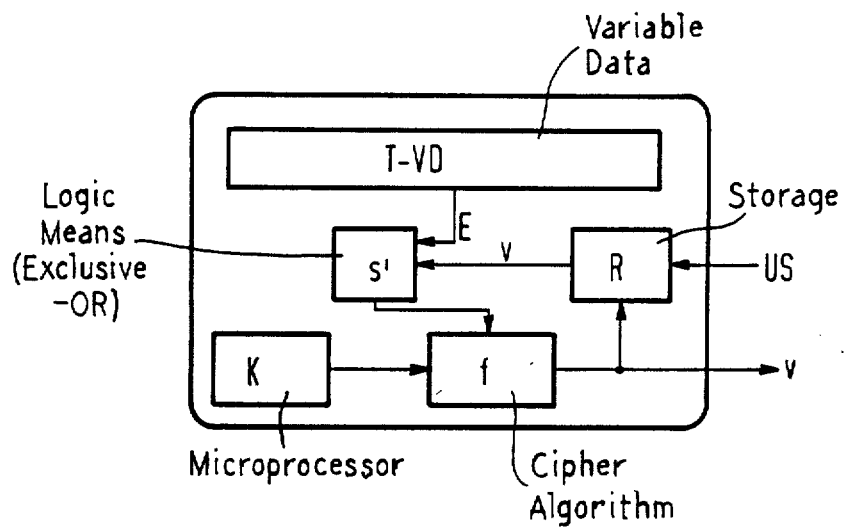
FIG. 5 is a development of the circuit arrangements of FIGS. 1 or 2.

FIG. 5 shows an improvement of the arrangements of FIGS. 1 and 2 insofar as the start value s is not directly formed from the output signal of the clock module T or from variable data VD (first input quantity E) but that a logical operation with a further input quantity is also carried out in addition. This further input quantity is a previously generated random number v that is intermediately stored in a register, for example, in an electrically erasable programmable read-only memory EEPROM or in a write-read memory RAM. As a result of the logical operation, for example with the assistance of an exclusive OR element, the modified start value s' and a correspondingly modified, new random number v are generated from a first input quantity E that has remained the same. Since an "old" random number is not available for the very first generation of a random number v, it is proposed that a randomly generated "original start value" US be written into the register R when the security module or, respectively, the chip card is personalized.

Figure 6:
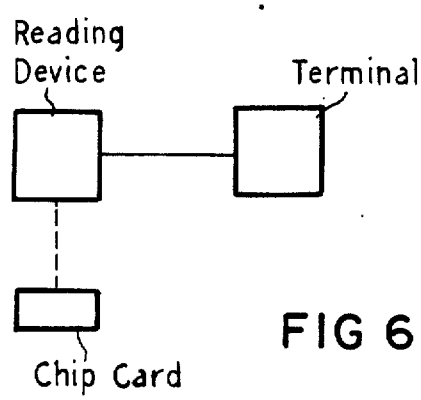
FIG. 6 is a diagram of the invention in conjunction with a terminal.

FIG. 6 shows a reading device for the chip card, connected with a terminal.

It will be apparent that various modifications and/or additions may be made in the apparatus of the invention without departing from the essential features of novelty involved, which are intended to be defined and secured by the appended claims.

What is claimed is:

1. A circuit arrangement for protecting access to a data processing system having a user terminal employing a reading device for a chip card, said chip card comprising an integrated module containing a microprocessor, and a secret key (K) stored in said chip card, a ciphering algorithm (f) being implemented in said microprocessor, and means for providing a variable start value (s) to said microprocessor, whereby a random number (v) according to the relationship $$v \text{ to } f(K;s)$$

is generated from said ciphering algorithm (f) and from said secret key (K) dependent on a variable start value (s).

2. The circuit arrangement according to claim 1, wherein said start value (s) is selected from data stored in said integrated module of said chip card.

3. The circuit arrangement according to claim 1, wherein said start value (s) is formed by the output signal of a real time clock circuit (T) integrated in said chip.

4. The circuit arrangement according to claim 1, wherein said start value (s) can be supplied from a source external to said chip card.

5. The circuit arrangement according to claim 1, wherein said chip card has means for storing said random number (v) and logic means to receive said stored random number (v) and a variable input quantity (E) and to form a modified start value (s').

6. The circuit arrangement according to claim 5, including means for supplying an original start value (US) for storage as the first stored random number.

7. The circuit arrangement according to claim 1, wherein said chip card has a shift register (SR) having an input, an output and a linear combination of individual register cells to which the start value (s) can be supplied at the input; a non-linear function module connected to the output of said shift register, an output signal of said non-linear function module being dependent on said secret key (K) and connected to the input of the shift register (SR) during one phase of operation of said shift register.

8. The circuit arrangement according to claim 7, including means for terminating said one phase of operation of said shift register, whereby a generated random number (v) appears at the output of the function module.

9. A method of protecting access to a data processing system having a user terminal employing a reading device for a chip card, comprising the steps of;
providing a microprocessor on said chip card for processing a ciphering algorithm,
providing a variable start value,
storing a common secret key both in said chip card and in said user terminal, and
deriving a random number from said secret key and from said ciphering algorithm in response to said variable start value, whereby a dynamic authentication of said chip card is established.

10. The method according to claim 9, including the step of using as the variable start value, a random number previously derived by said microprocessor.

* * * * *